United States Patent [19]

Torii et al.

[11] Patent Number: 4,829,840
[45] Date of Patent: May 16, 1989

[54] INDUSTRIAL ROBOT WITH REPLACEABLE MODULE

[75] Inventors: Nobutoshi Torii, Hachioji; Ryo Nihei, Musashino, both of Japan

[73] Assignee: Fanuc Ltd., Yamanashi, Japan

[21] Appl. No.: 50,302

[22] PCT Filed: Sep. 11, 1986

[86] PCT No.: PCT/JP86/00467

§ 371 Date: Jun. 11, 1987

§ 102(e) Date: Jun. 11, 1987

[87] PCT Pub. No.: WO87/01644

PCT Pub. Date: Mar. 26, 1987

[30] Foreign Application Priority Data

Sep. 11, 1985 [JP] Japan ............... 60-200815

[51] Int. Cl.⁴ .................. F16H 25/20; B25J 18/00
[52] U.S. Cl. ................... 74/89.15; 74/424.8 R; 74/479; 901/15; 901/21
[58] Field of Search ............ 74/479, 469, 424.8 R, 74/424.8 NA, 89.15; 901/15, 17, 18, 21, 23, 24, 27

[56] References Cited

U.S. PATENT DOCUMENTS

| | | | |
|---|---|---|---|
| 3,043,448 | 7/1962 | Melton | 901/15 X |
| 3,805,629 | 4/1974 | Martin et al. | 901/17 X |
| 3,888,362 | 6/1975 | Fletcher et al. | 901/15 X |
| 4,566,847 | 1/1986 | Maeda et al. | 901/23 X |
| 4,585,387 | 4/1986 | Jayne | 901/15 X |
| 4,600,355 | 7/1986 | Johnson | 901/15 X |
| 4,636,138 | 1/1987 | Gorman | 901/15 X |
| 4,697,472 | 10/1987 | Hiyane | 901/24 X |

FOREIGN PATENT DOCUMENTS

| | | | |
|---|---|---|---|
| 2224349 | 11/1973 | Fed. Rep. of Germany | 901/15 |
| 2341133 | 2/1975 | Fed. Rep. of Germany | 901/23 |
| 52-67167 | 5/1977 | Japan . | |
| 59-59385 | 4/1984 | Japan . | |
| 763082 | 9/1980 | U.S.S.R. | 414/735 |

Primary Examiner—Allan D. Herrmann
Attorney, Agent, or Firm—Staas & Halsey

[57] ABSTRACT

An industrial robot having replaceable modules assembled on a bed (2) housing a drive mechanism therein is composed of blocks (1, 3, 4, 5, 9) which comprise members of compatible common structures that can be selected and assembled as modules. The blocks have engagement portions compatible with those of modules of other specifications. Therefore, different robot specifications can easily be met, and the modules can be replaced with those modules which are effective in a wide range. The blocks of the industrial robot can easily be assembled and disassembled.

14 Claims, 3 Drawing Sheets

INDUSTRIAL ROBOT WITH REPLACEABLE MODULE

CROSS REFERENCE TO RELATION APPLICATION

The subject matter of the present application is related to that of U.S. Application Ser. No. 050,303, filed June 11, 1987.

TECHNICAL FIELD

The present invention relates to an industrial robot having replaceable modules, the robot being composed of blocks each of a unit structure.

BACKGROUND ART

Industrial robots are widely used in various fields in recent years. FIG. 3 of the accompanying drawings is a side elevational view showing by way of example a horizontally articulated industrial robot having an angularly movable post mounted on a bed installed on a floor.

A post 1 is mounted on a bed 2 installed on a floor and is angularly movable in a prescribed angular range ($\theta$). The bed 2 houses therein a turning mechanism 21 for angularly moving the post 1. A first arm 3 is supported on the upper end of a support shaft 4 inserted in the post 1 from above, and a second arm 5 which is horizontally angularly movable is mounted on the distal end of the first arm 3. A wrist 51 is attached to the distal end of the second arm 5.

The post 1 houses therein a drive mechanism 6 vertically movable within a prescribed range (Z) for controlling the height of the first arm 3.

The industrial robot of the type described is designed and manufactured to desired individual specifications. Therefore, for manufacturing an industrial robot with a post 1 having a different height or first and second arms 3, 5 having different lengths, a long period of time is required before the robot is completed, and the cost of manufacture is high as the robot is customized.

SUMMARY OF THE INVENTION

The present invention has been made in view of the aforesaid problems of the conventional industrial robot. It is an object of the present invention to provide an industrial robot having replaceable modules assembled on a bed housing a drive mechanism therein, comprising a plurality of functional blocks successively coupled on said bed, an engagement mechanism for separably engaging said functional blocks, and an engagement structure compatibly used between modules of the same type of said functional blocks.

Each of the functional blocks of the industrial robot is of a unit structure which can easily be assembled and disassembled, and each block has a compatible engagement portion for easy replacement. Therefore, blocks of the same kind can easily be replaced, and blocks of different specifications can be replaced.

DETAILED DESCRIPTION OF THE PREFERRED EMBODIMENTS

A preferred embodiment of the present invention will hereinafter be described in specific detail with reference to the drawings.

Figure 1:
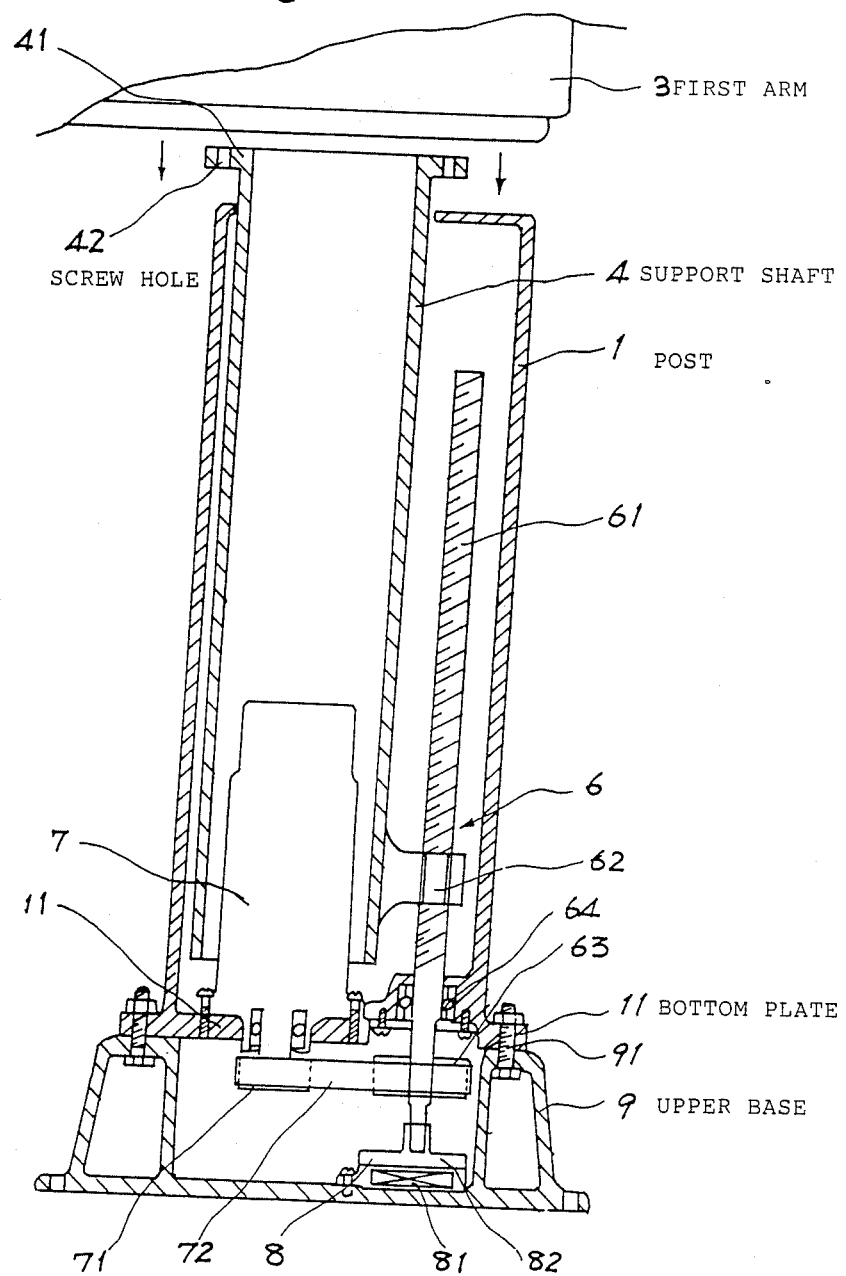
FIG. 1 is a vertical cross-sectional view of an embodiment of an industrial robot having replaceable modules.
Figure 3:
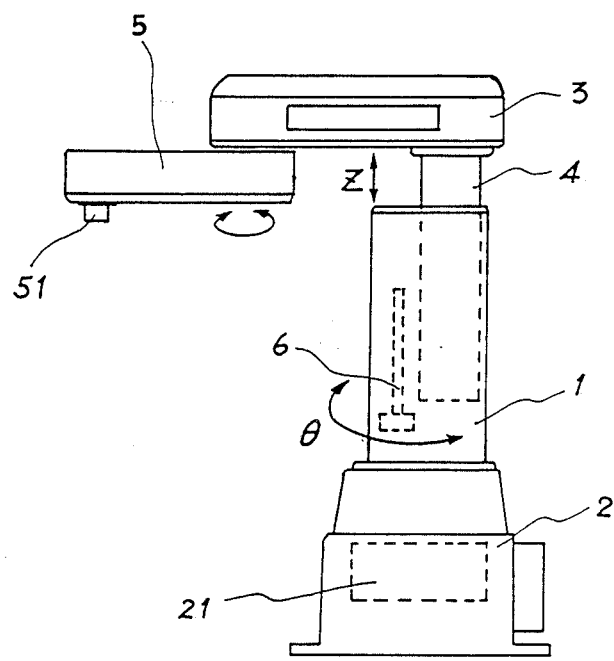
FIG. 3 is a side elevational view of a conventional horizontally articulated industrial robot.

FIG. 1 is a vertical cross-sectional view of an embodiment of an industrial robot having replaceable modules according to the present invention. Those parts which are identical to those shown in FIG. 3 are denoted by identical reference numerals, and will not be described in detail.

An upper portion 41 of a support shaft 4 shown in FIG. 1 has a flange having a plurality of screw holes 42 for attachment of a first arm 3. A bottom plate 11 of a post 1 and an upper portion of an upper base 9 are attached to each other by means of attachment screws 91. Each of the blocks of the first arm 3, the post 1, and the upper base 9 is of a unit structure. These unit members have attachment screw positions and other engagement portions which are compatibly structured such that arms, posts, and upper bases of different specifications can be installed.

The post 1 houses therein a support shaft 4 supporting the first arm 3 on its upper portion for controlling the height of the first arm 3, a drive mechanism 6 comprising a ball screw 61 and a nut 62 for vertically moving the support shaft 4, and a transmission mechanism comprising a belt 72 and pulleys 63, 71.

A drive motor 7 having a motor pulley 71 is mounted on the bottom plate 11 of the post 1 for rotating the ball screw 61 through the belt 72 trained around the drive pulley 63 mounted on the ball screw 61. Since the nut 62 threaded over the ball screw 61 is supported on a side of the support shaft 4, the support shaft 4 is vertically moved upon rotation of the ball screw 61 to move the nut 62 upwardly or downwardly. The ball screw 61 is supported on the bottom plate 11 of the post 1 by means of a bearing 64. A brake mechanism 8 is mounted in the upper base 9 and coupled to the lower end of the ball screw 61 for controlling the rotation of the ball screw 61. The brake mechanism 8 includes a fixed brake member 81 having an electromagnetic coil. When the electromagnetic coil is energized to electromagnetically attract a brake shoe 82 attached to the ball screw 61, the rotation of the ball screw 61 is braked to brake the vertical movement of the support shaft 4 through the nut 62.

The support shaft 4 can easily be detached from the post 1 by turning the ball screw 61 to move the nut 62 up to the upper end of the ball screw 61.

Figure 2:
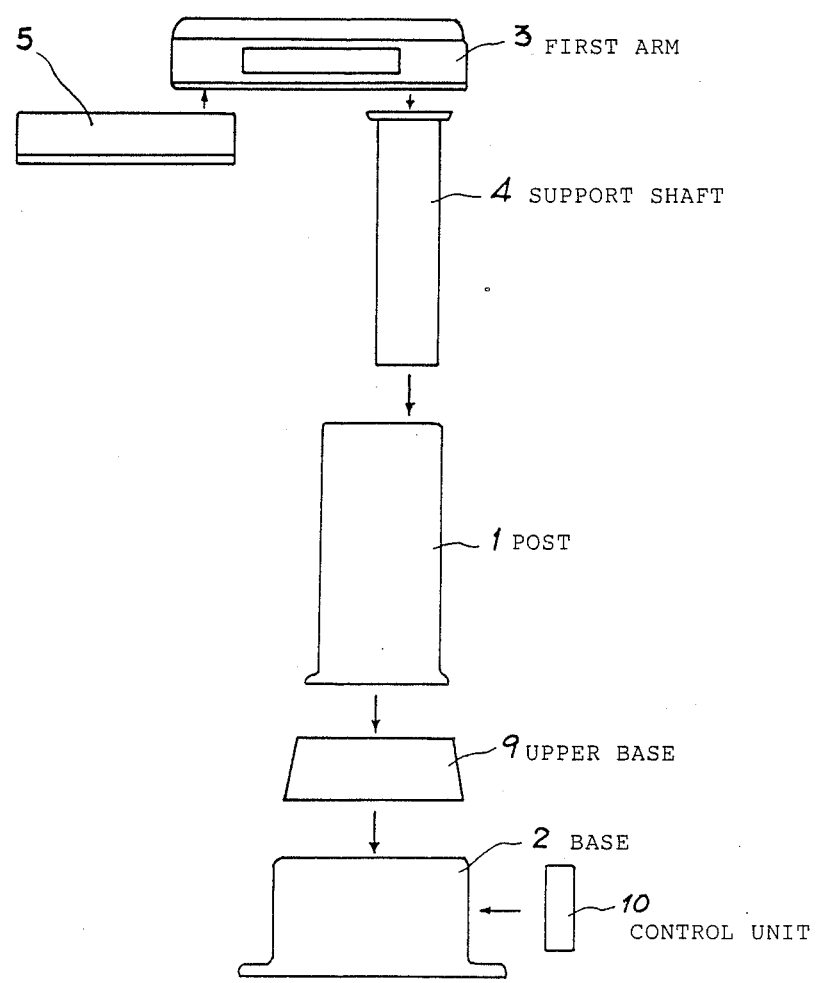
FIG. 2 is a schematic view showing modular functional blocks in the industrial robot.

FIG. 2 schematically shows, by way of example, modular functional blocks of an industrial robot of the present invention. Those parts which are identical to those shown in FIGS. 1 and 3 are denoted by identical reference numerals. Denoted at 10 in FIG. 2 is a control unit housing a control device for controlling the drive motor 7 and the turning mechanism 21 which angularly moves the post 1 and also for controlling another operation mechanism (not shown) of the industrial robot.

The first arm 3, the support post 4, the post 1, and the upper base 9 can individually be attached and detached as described above with reference to FIG. 1. Other blocks (not shown) can also be attached and detached using attachment screws and other engagement mechanisms.

Operation of the present embodiment thus constructed will be described below.

As described above, the blocks of the industrial robot are separably constructed. Therefore, when an industrial robot having a different range (Z) of vertical movement of the first arm 3 is desired, the lengths of the support shaft 4, the post 1, and the ball screw 61 are varied to those which meet the desired range of vertical movement. The blocks are then assembled without changing the drive motor 7, the brake mechanism 8, and the other members. The industrial robot having the desired movement range can thus be produced. When an arm that is extensible and contractable, rather than angularly movable, is to be used in place of the second arm 5, the second arm 5 may be detached from the engagement mechanism at the distal end of the first arm 3, and an extensible and contractable arm having an engagement portion compatible with the engagement mechanism may be attached. If the brake mechanism 8 is not necessary, the attachment screws 91 interconnecting the upper base 9 and the post 1 are removed, and the post 1 is detached to open the interior of the upper base 9 so that easy access can be gained into the upper base 9. Then, the brake mechanism 8 is detached, with the result that an industrial robot of desired specifications can easily be obtained.

As described above, the respective blocks can individually be detached, and various types of work can easily be effected since the blocks are compatibly constructed.

Although a certain preferred embodiment has been shown and described, it should be understood that many changes and modifications may be made therein without departing from the scope of the invention.

According to the present invention, there is provided a module system for an industrial robot comprising various blocks each of a unit structure, the blocks being easily attachable and detachable and having engagement portions which are compatible with those of other specifications. Therefore, different specifications can easily be met, a time period required to manufacture a desired industrial robot can be shortened, and the cost of manufacture can be reduced.

Since the respective blocks can easily be detached, the industrial robot of the invention can be maintained and inspected with ease. The industrial robot can thus be increased in reliability and can easily be repaired.

We claim:

1. An industrial robot having a bed housing a drive mechanism therein, comprising:
   a plurality of functional blocks successively coupled on said bed; and
   means, associated with each functional block, for separably connecting said functional blocks to each other; said connecting means being
   compatibly used for installing replacement functional blocks of the same type and having compatible connecting means but having different specifications than said functional blocks.

2. An industrial robot according to claim 1, wherein said functional blocks comprise an upper base engaging on said bed, a post engaging said upper base, a vertically movable support shaft having an upper end and being movable within said post, and an arm apparatus connected to the upper end of said support shaft.

3. An industrial robot according to claim 2, wherein the connecting means for connecting said upper base and said post and said upper end of the support shaft and said arm apparatus comprises a plurality of attachment screws.

4. An industrial robot according to claim 2, wherein the arm apparatus comprises first and second arms held in engagement with each other, said second arm comprising an extensible and contractible arm.

5. An industrial robot according to claim 2, wherein the post includes a bottom plate and the drive mechanism includes a drive motor supported on the bottom plate.

6. An industrial robot according to claim 5, wherein the drive mechanism is operable to vertically move the support shaft.

7. An industrial robot according to claim 2, wherein the drive mechanism includes a ball screw rotatably connected to said post, a nut fixedly connected to said support shaft and threadedly engaging said ball screw, and a drive motor for rotating said ball screw.

8. An industrial robot according to claim 7, further comprising brake means connected to said upper base and to said ball screw for braking rotational movement of the ball screw.

9. An industrial robot according to claim 8, wherein the brake means is removable.

10. An industrial robot according to claim 7, wherein the post, ball screw and support shaft are separably replaceable with posts, ball screws and support shafts of various sizes.

11. A post assembly for an industrial robot comprising:
    an arm;
    a bottom plate separably connectable to a base;
    a post connectable to and extending upwardly from the bottom plate;
    a support shaft vertically movable in said post and having an upper end separably connectable to the arm,
    means for connecting the arm to the upper end of the support shaft and the bottom plate to the base, and
    drive means, connected to the bottom plate, for movably connecting the support shaft to the post and for driving the support shaft upwardly and downwardly, wherein the post and support shaft are interchangeable with posts and support shafts having similar support means but different sizes.

12. A post assembly as recited in claim 11, wherein the drive means comprises:
    a drive motor connected to the bottom plate, a ball screw journalled in said bottom plate, a nut connected to the support shaft and threadedly engaging the ball screw, and a belt for transmitting rotation of the drive motor to rotation of the ball screw.

13. A post assembly is recited in claim 12, wherein the ball screw is interchangeable with ball screws of various sizes.

14. An industrial robot having a bed housing a drive mechanism therein, comprising:
    a plurality of functional blocks successively coupled on said bed;
    means, associated with each functional block, for separably connecting said functional blocks to each other; said connecting means being compatibly used for installing replacement functional blocks of the same type and having compatible connecting means but having different specifications than said functional blocks;
    an upper base engaging on said bed, a post engaging said upper base, a vertically movable support shaft having an upper end and being movable within said post, and an arm apparatus connected to the upper end of said support shaft;

a ball screw rotatably connected to said post, a nut fixedly connected to said support shaft and thread-edly engaging said ball screw, and a drive motor for rotating said ball screw; and brake means connected to said upper base and to said ball screw for braking rotational movement of the ball screw.

* * * * *

UNITED STATES PATENT AND TRADEMARK OFFICE
CERTIFICATE OF CORRECTION

PATENT NO. : 4,829,840

DATED : May 16, 1989

INVENTOR(S) : Nobutoshi Torii et al.

It is certified that error appears in the above-identified patent and that said Letters Patent is hereby corrected as shown below:

FRONT PAGE [73] Assignee: "Yamanashi," should be --Minamitsuru,--.

FRONT PAGE [56] Column 2, FOREIGN PATENT DOCUMENTS

Please delete this section in its entirety, and in place thereof, insert the following new section:

```
            --FOREIGN PATENT DOCUMENTS
   1245618   10/1960    France .
   2224349   .11/1973   Fed. Rep. of Germany . . . . . 901/15
   2341133    2/1975    Fed. Rep. of Germany . . . . . 901/23
   2537800    7/1976    Fed. Rep. of Germany .
   52-67167   5/1977    Japan .
   763082     9/1980    U.S.S.R. . . . . . . . . . . . 414/735
   59-59385   4/1984    Japan .
   642296     4/1984    Switzerland .
   3323976    9/1984    Fed. Rep. of Germany .
   8511473    3/1985    Fed. Rep. of Germany .
            OTHER PUBLICATIONS
   European Search Report, FROM EP-86905419, Dated 2/8/88.--
```

Col. 1, line 5, "RELATION" should be --RELATED--.

Signed and Sealed this

Twenty-fourth Day of October, 1989

Attest:

DONALD J. QUIGG

Attesting Officer

Commissioner of Patents and Trademarks